(12) United States Patent
Bass

(10) Patent No.: US 6,644,003 B1
(45) Date of Patent: Nov. 11, 2003

(54) METHOD AND APPARATUS FOR COLLECTING, SHREDDING AND DISPERSING LEAVES

(76) Inventor: Daniel C. Bass, 1615 Wellerman Rd. Apt. 605, West Monroe, LA (US) 71291

( * ) Notice: Subject to any disclaimer, the term of this patent is extended or adjusted under 35 U.S.C. 154(b) by 0 days.

(21) Appl. No.: 10/137,841

(22) Filed: May 1, 2002

(51) Int. Cl.[7] ............................................... A01D 42/06
(52) U.S. Cl. ..................................................... 56/12.8
(58) Field of Search ................................ 56/12.8, 12.9, 56/13.3, 13.4, 16.4 R, DIG. 5, 13.1, 13.2, 320.2

(56) References Cited

U.S. PATENT DOCUMENTS

| | | | |
|---|---|---|---|
| 2,105,803 A | | 1/1938 | Barnes |
| 2,538,643 A | * | 1/1951 | Gregory ..................... 56/13.1 |
| 2,669,078 A | * | 2/1954 | Gregory ..................... 56/13.2 |
| 3,688,479 A | * | 9/1972 | Martinson et al. ............ 56/13.2 |
| 3,986,463 A | * | 10/1976 | Houston et al. ............. 111/200 |
| 4,741,148 A | * | 5/1988 | Ekas et al. .................... 56/12.9 |
| 5,085,376 A | | 2/1992 | Litchenburg |
| 5,189,868 A | | 3/1993 | Hill |
| 5,240,188 A | | 8/1993 | Whitmire |
| 5,485,715 A | | 1/1996 | Breeden |
| 5,685,134 A | * | 11/1997 | Thornburg ................... 56/12.9 |
| 6,086,002 A | * | 7/2000 | Frazier et al. ................ 241/47 |
| 6,098,387 A | * | 8/2000 | Pfisterer .................. 56/16.4 R |

* cited by examiner

Primary Examiner—Robert E. Pezzuto
Assistant Examiner—Nathan Mammen
(74) Attorney, Agent, or Firm—Robert N. Montgomery

(57) ABSTRACT

A leaf vacuum and mulching implement for attachment by three-point-hitch to a farm tractor and driven by mechanical connection to the tractor's power tack-off unit (PTO). The implement utilizes a broad vacuum deck having polymeric skirts in near proximity with the ground and a floating three-point-hitch system for lifting the vacuum deck and allowing it to follow the ground contour. High velocity fans blow debris collected by the vacuum deck to a unique, rotating, multifaceted, conical shredding rotor prior to directional dispersion.

17 Claims, 7 Drawing Sheets

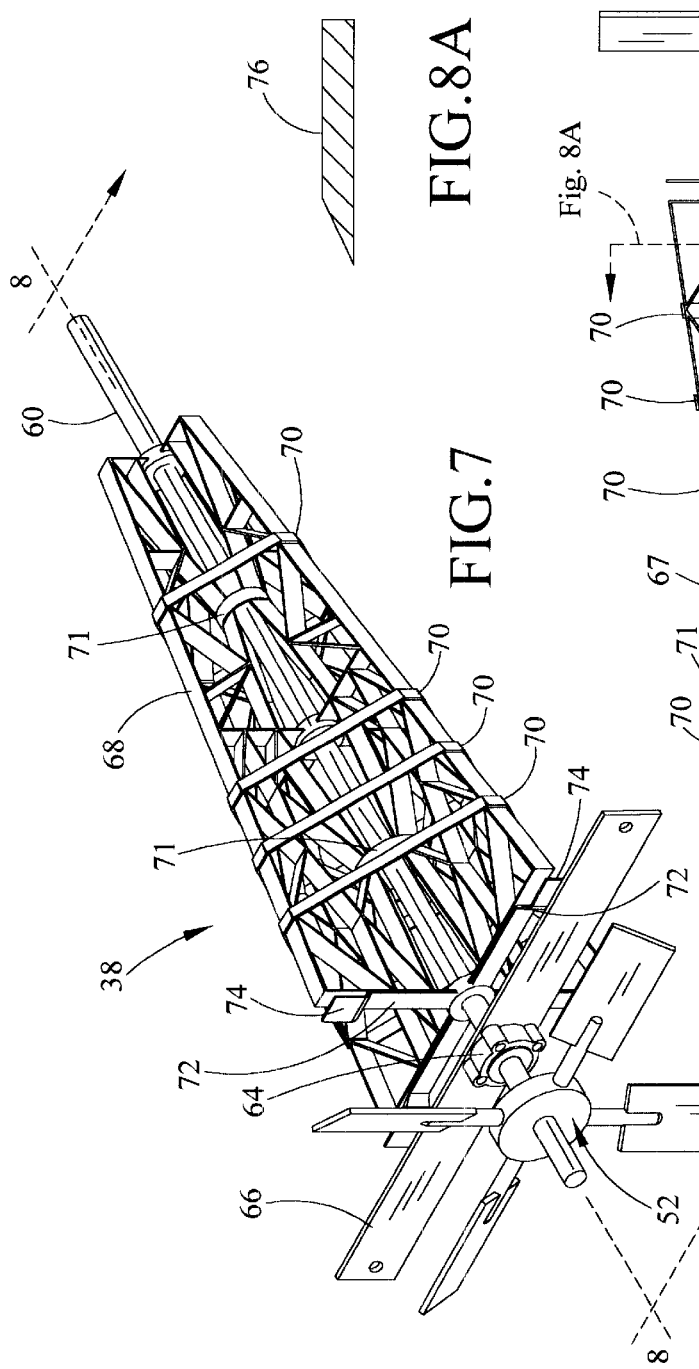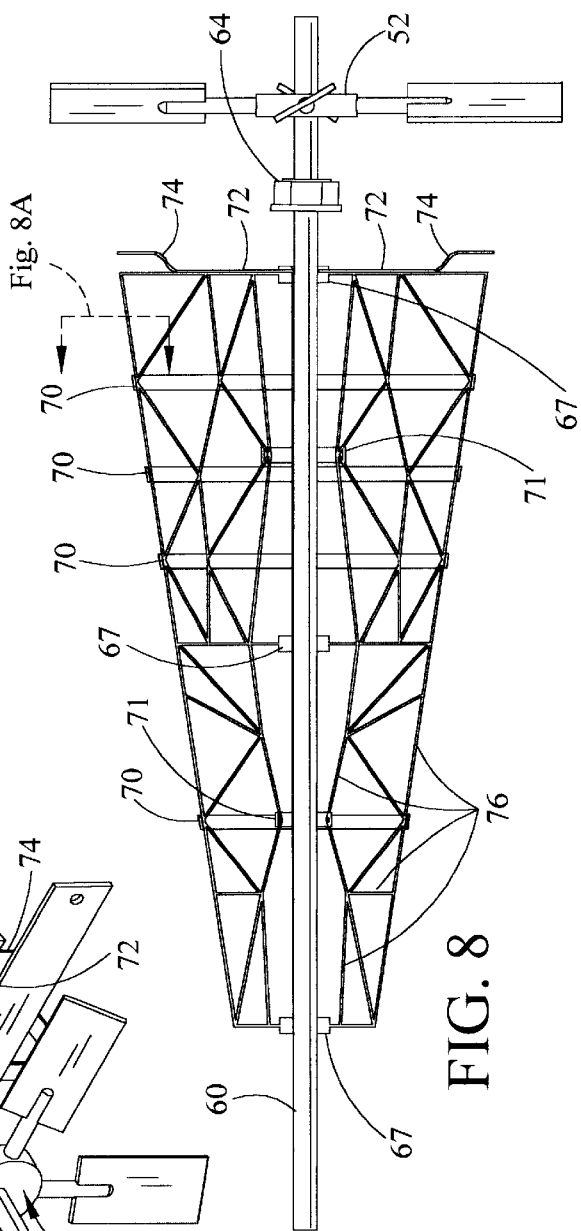

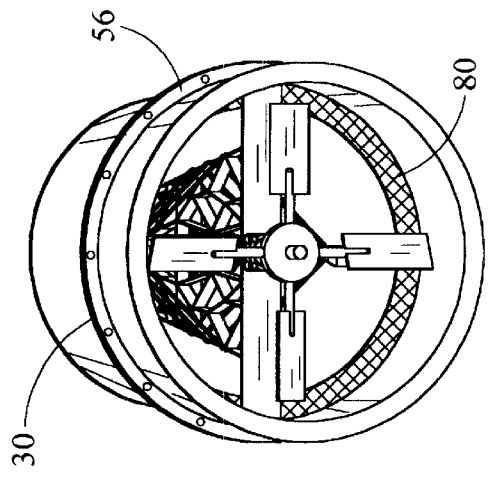
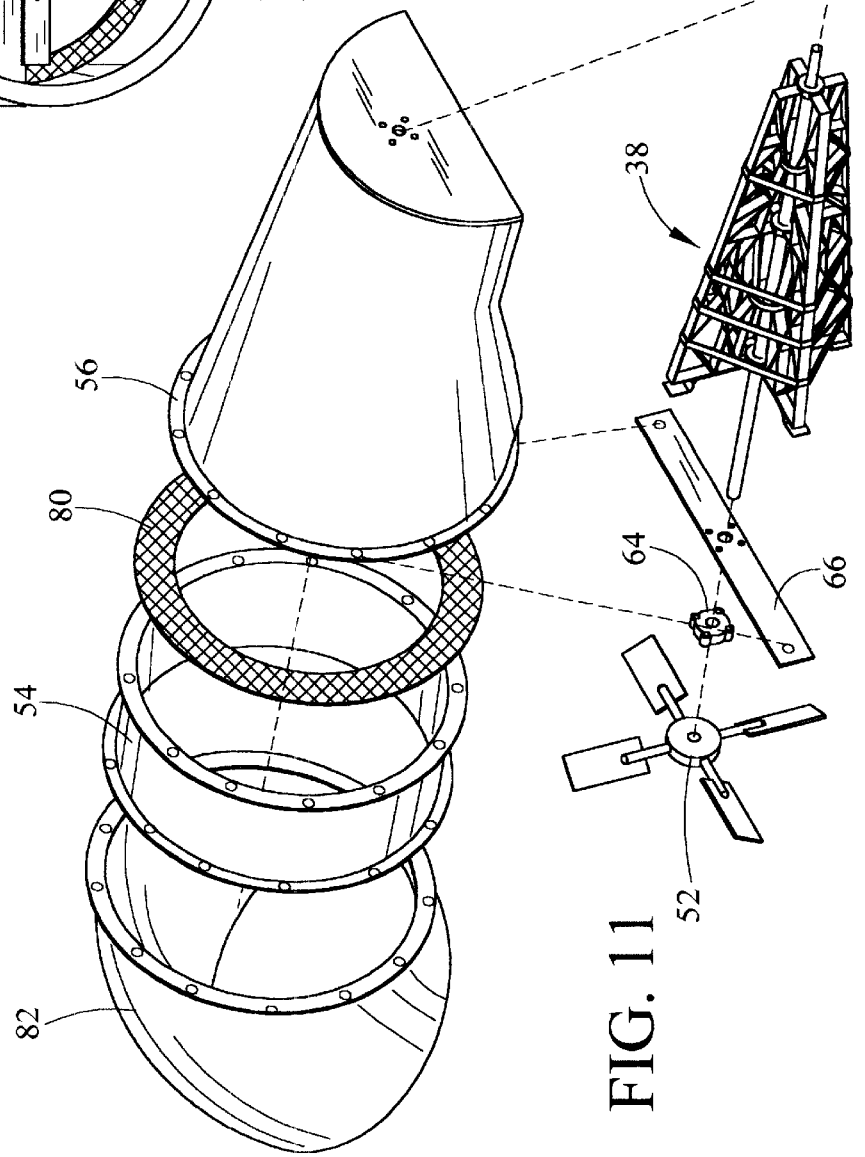
FIG. 10
FIG. 11

METHOD AND APPARATUS FOR COLLECTING, SHREDDING AND DISPERSING LEAVES

SPECIFICATION

1. Field of the Invention

This invention relates generally to commercial leaf vacuum and mulching apparatus and more particularly to a tractor PTO driven leaf vacuum apparatus with mulching and directional dispersion capability attached to the tractor in a three-point hitch arrangement.

2. General Background

Large acreage, such as tree farms, orchards, and golf courses, are in constant need of maintenance due to fallen leaves, small twigs, etc. In addition to being unsightly, such debris tends to cover the ground, thereby retarding grass growth while producing a fire hazard.

It is well known that leaves and fine debris provide excellent mulch when broken down into fine particles, preventing evaporation of moisture, and adding humus to the soil. Therefore, it is advantageous for the leaves and fine debris to remain in and around trees provided their bulk can be broken down into very fine particles and dispersed evenly over the earth.

Various apparatus have been developed for collecting by seeping or vacuuming leaves and other such debris and reducing their particle size and re-depositing them back on the ground or into some type of towed container for transport and disposal at a remote site.

The prior art vacuum and/or mulching apparatus are generally associated with grass cutting mowers and are usually towable behind relatively small lawn type tractors and are self-powered. That is to say that most such apparatus have an onboard engine, thereby allowing for a flexible turning radius for the towed apparatus. Further, such mulching apparatus are generally associated with belly mowers located below the towing tractor type vehicle whereby the mulching system, having a blower for creating a vacuum, is connected to the belly mower of a lawn tractor by a large hose for collecting grass clippings, as well as leaves, stirred up by the mower's blade. The hose, as well as the mulching apparatus trailer, makes the system very hard to maneuver around trees and obstacles. A rotor located within the shredding apparatus having a plurality of flails or rotating blades serve to further shred the debris prior to disposition. However, although the need to reduce the debris into fine particles is recognized by the prior art, there is very little indication of just how fine the particles should be and very little agreement about how particle size reduction should be accomplished. Therefore, it is assumed that it is advantageous to reduce the debris to as small a particle size as possible, thereby making the debris virtually invisible when dispersed back on the ground. Many of the prior art mulching apparatus are incapable of such fine particle size reduction.

Devices that serve strictly as a vacuum type apparatus, such as those disclosed by U.S. Pat. Nos. 2,105,803, and 5,085,376 are towable or push type apparatus with onboard engines and rely on either the internal fan for both vacuuming and shredding the debris or a blower fan in combination with rotating spokes for shredding and expelling the debris.

The prior art, when taken as a whole, tends to teach the concept of collecting and dispersing leaves and twigs mostly combined with lawn clippings on a relatively small scale when time is not a factor but fails to address the need for speed and maneuverability over large acreage where man hours are limited. In such cases it is essential that a leaf mulching apparatus be efficient and adaptive to existing high-speed equipment, be capable of covering large acreage in a short time span, and also be highly maneuverable.

SUMMARY OF THE INVENTION

The instant invention is principally a leaf vacuum and mulching implement for attachment by three-point-hitch to a farm tractor and driven by mechanical connection to the tractor's power tack-off unit (PTO) or by a hydraulic motor driven by the tractor's auxiliary hydraulic system. The implement utilizes a broad vacuum deck having polymeric skirts in near proximity with the ground and a floating three-point-hitch system for lifting the vacuum deck and allowing it to follow the ground contour. High velocity fans blow debris collected by the vacuum deck into a unique, rotating, multifaceted, conical shredding rotor prior to directional dispersion.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 7 is an isometric view of the particle sizing rotor assembly;

FIG. 8 is a side view of the particle sizing rotor assembly;

FIG. 10 is an isometric end view of the particle sizing, rotor housing with directional bell housing removed; and FIG. 11 is an exploded isometric view of the particle sizing, rotor housing.

DETAILED DESCRIPTION OF THE PREFERRED EMBODIMENT

Figure 1:
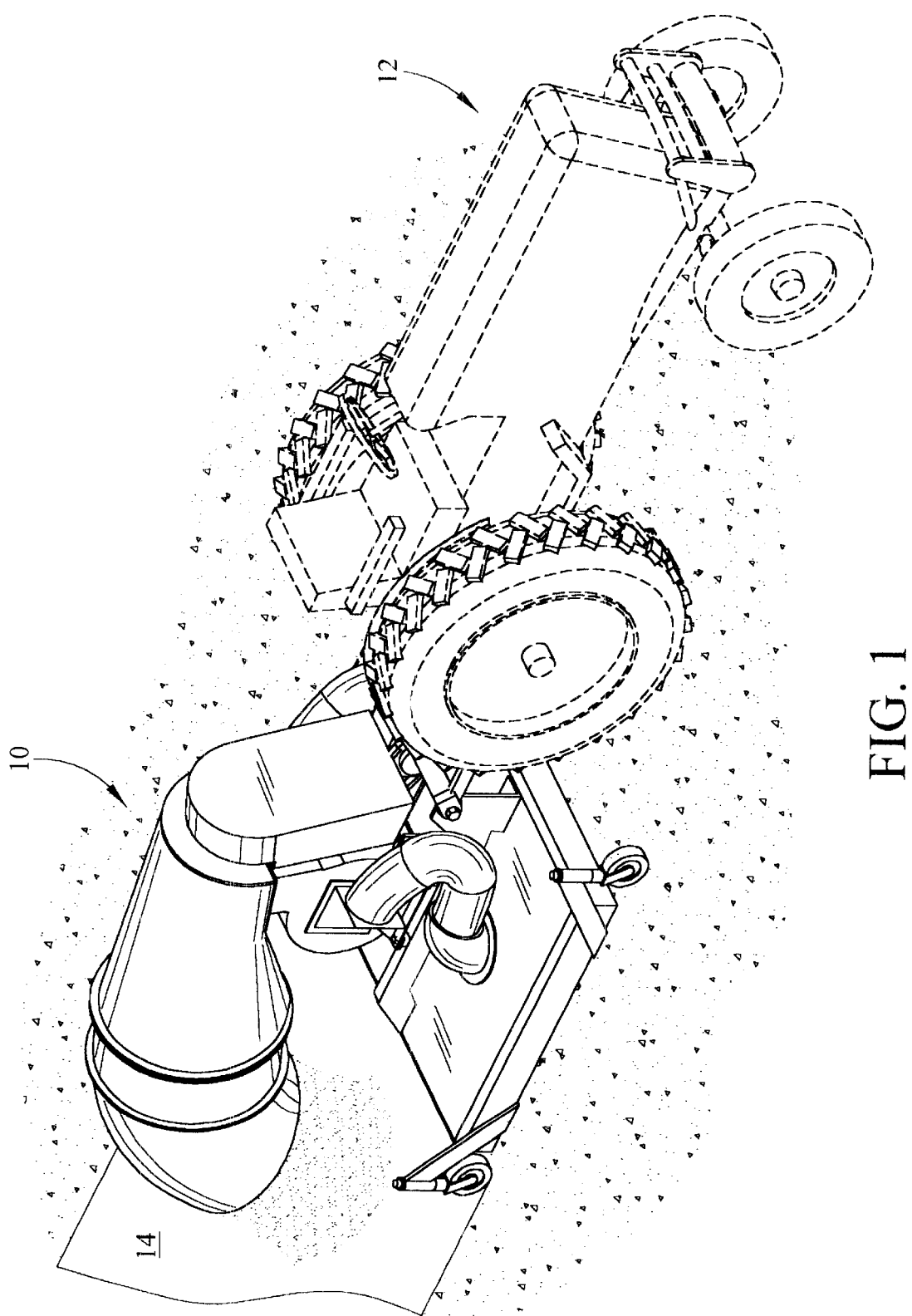
FIG. 1 is a frontal isometric illustration of the preferred embodiment of the mulching apparatus in operation.
Figure 2:
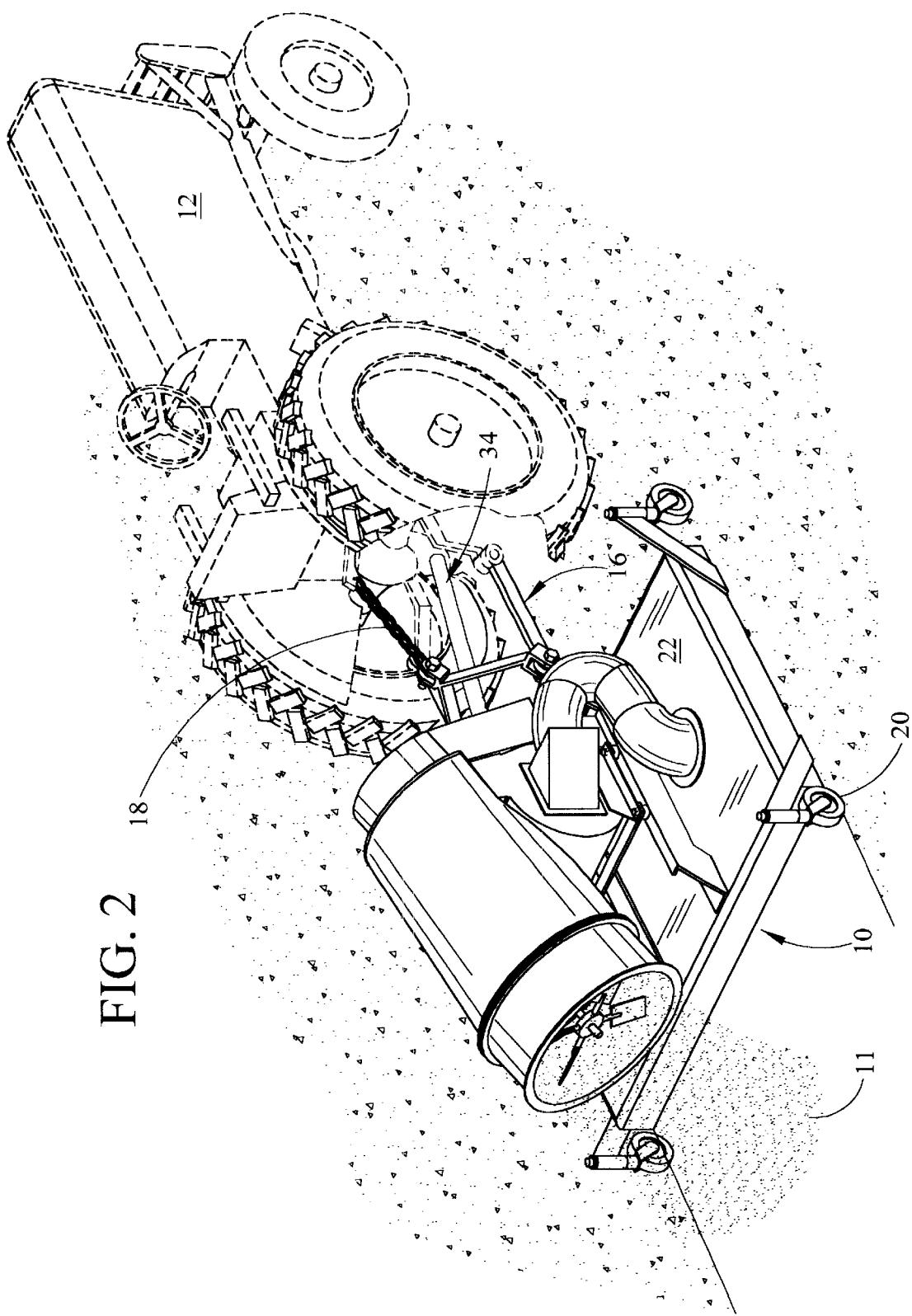
FIG. 2 is a rearward isometric illustration of the preferred embodiment of the mulching apparatus in operation.

As first depicted in FIG. 1, the vacuum mulching and dispersion unit is a farm implement adapted to any common farm tractor 12 for high-speed operation and maneuverability. The mulching apparatus is capable of vacuuming leaves and fine debris in large swaths of from 8 to 10 feet wide before mulching and dispersing the debris 11 back on the ground adjacent the mulching apparatus 10. As seen in FIG. 2, the mulching implement 10 is attached to the tractor by a three-point-hitch arrangement 16 capable of lifting the implement clear of the ground for easy turn-around and is further fitted with a flexible upper connection element 18, such as chain, commonly utilized in the art for allowing the implement to float or follow the contour of the ground. Adjustable height, swivel wheels 20 located at each corner of the vacuum deck 22 maintain ground clearance and further allow the mulching apparatus 10 to pivot as the tractor maneuvers around obstacles.

Looking now at FIG. 3 we see that the vacuum deck 22 is fitted with polymeric skirts 24 located below the deck 22 and extending the full width of the deck 22, thereby providing a relatively large vacuum box below the deck 22. Since no mower blades are utilized with this apparatus, a more positive vacuum can be maintained. Large fan ducts 26 draw debris from openings in the vacuum deck 22 into the intakes of twin high velocity induction fans 28 connected in tandem with their outlets connected to the rotor housing 30.

Figure 3:
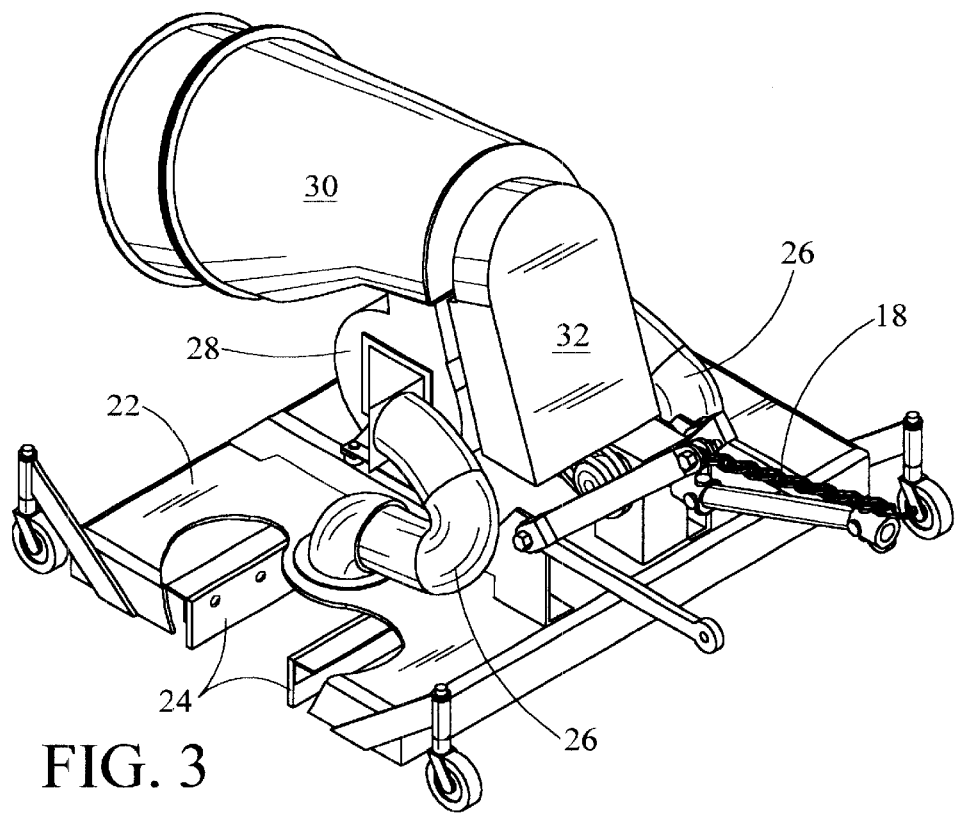
FIG. 3 is a frontal isometric view of the preferred embodiment of the mulching apparatus with cut-a-way view.
Figure 4:
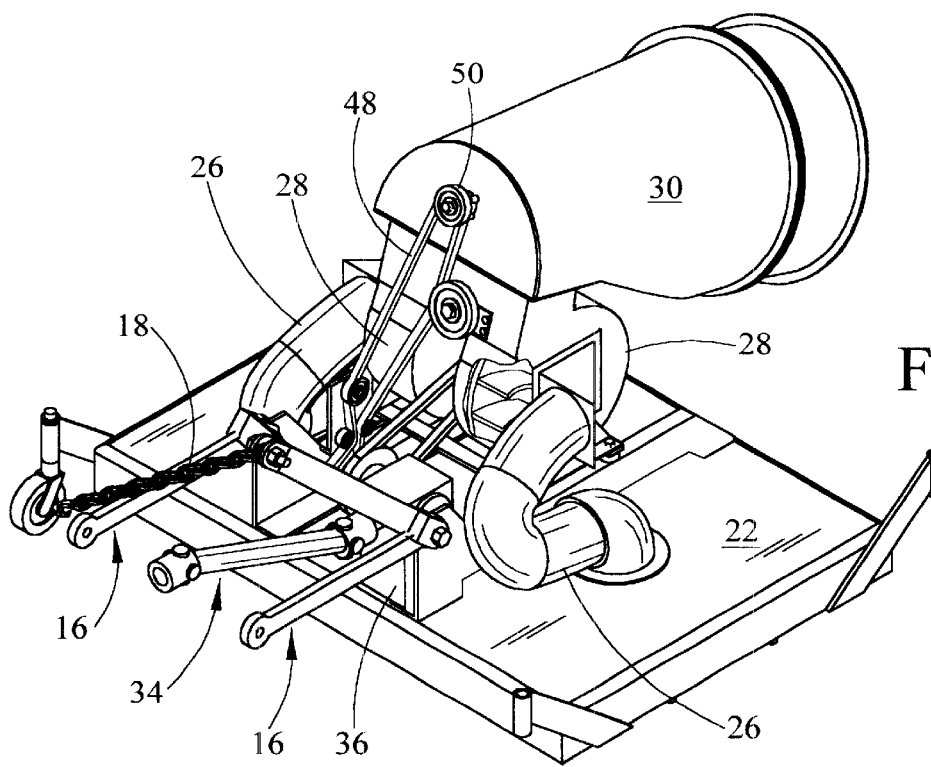
FIG. 4 is a partially exposed isometric view of the preferred embodiment of the mulching apparatus illustrated in FIG. 3 showing the drive system and fan cut-a-view.
Figure 5:
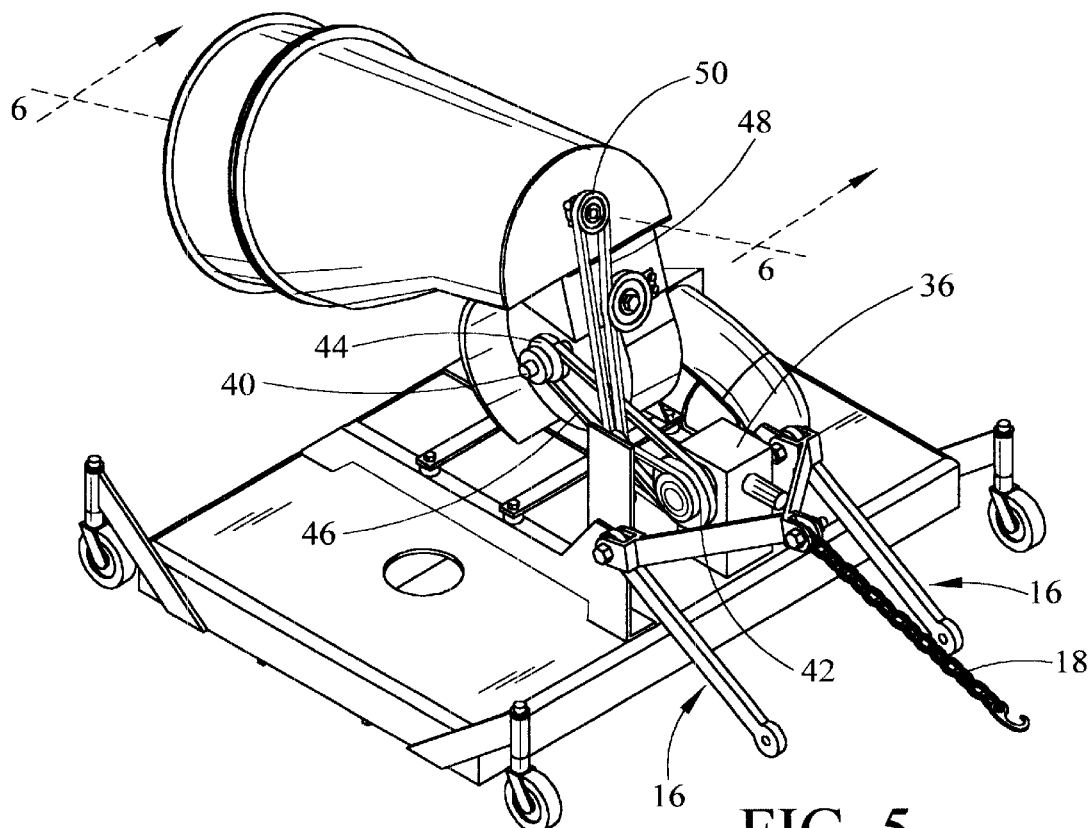
FIG. 5 is a partially exposed isometric view of the preferred embodiment of the mulching apparatus illustrated in FIG. 4 showing the drive system and fan drive with one fan and duct assembly removed.

Much of the drive mechanism is concealed by the cover 32, seen in FIG. 3, and is therefore better seen exposed in FIG. 4. A drive shaft assembly 34 connectable to the output shaft of the tractor's PTO drive running at 540 rpm is connected to a gear box 36 having a 4 to 1 ratio, thereby increasing the gear box 36 output to 2,160 rpm. Pulleys attached to the gearbox's output shaft are then used to drive both the dual high velocity fans 28 at 5,220 rpm and the mulching rotor assembly 38, seen in FIG. 7, at 2,160 RPM. The drive arrangement is best seen in FIG. 5 which illustrates a belt-driven series of pulleys utilizing a 50 percent pulley speed reduction that is utilized to drive the common fan shaft 40, shown in cut-a-way with one of the fans removed. The output shaft of the gear box 36 is fitted with a dual pulley 42 having an 8-inch diameter pulley and a 4-inch diameter, the 8-inch pulley having a belt 46 connected to a 4-inch pulley located on fan shaft 40. The 4-inch drive pulley is then connected by belt 48 through a system of idler pulleys in a right angle manner upwards to the rotor pulley 50.

Figure 6:
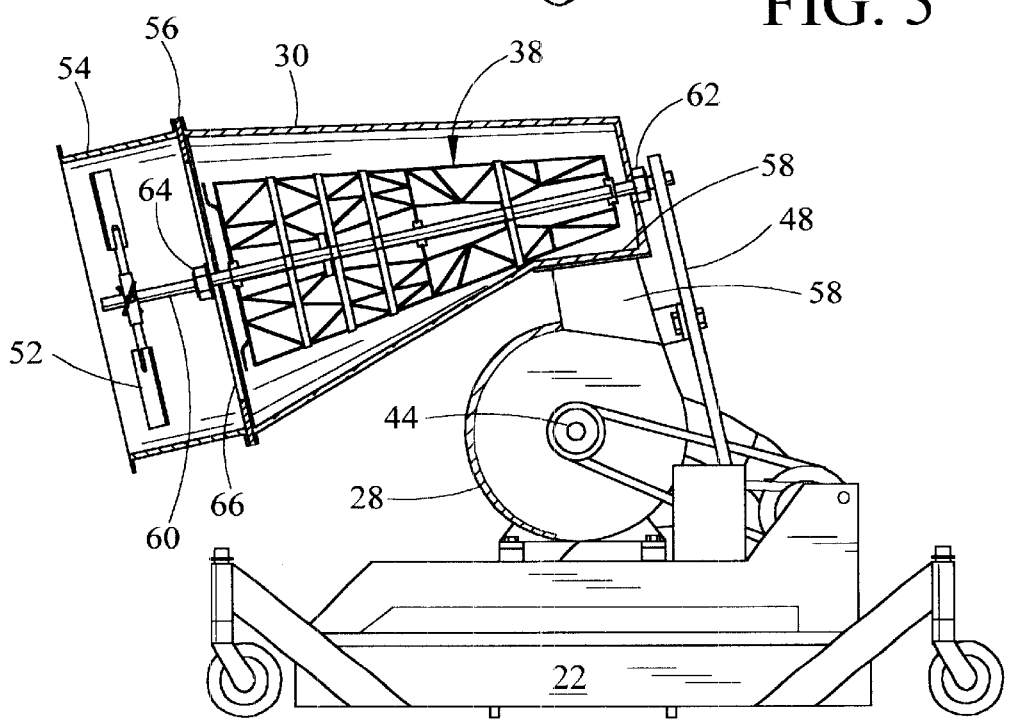
FIG. 6 is a vertical side view with partial cross section view of the particle sizing rotor assembly taken along sight lines 6—6 seen in FIG. 5.

Leaves and other debris vacuumed from the ground by the high velocity fans are blown into the rotor housing 30, seen in FIG. 6, where mulching takes place due to repeated contact with the conical-shaped multifaceted rotor assembly 38 prior to being discharged by a fan located in a fan housing or shroud 54 connected to the rotor housing 30 at flange 56. The rotor assembly 38 sizes the materials passing through the rotor housing 30 to between approximately 50 micron up to one inch with the average size being approximately ¼ inch. The rotor housing 30 is a truncated conical shape and has a flattened portion near the truncation for making connection by flange mounting with the dual fan outlet ducts 58. The fan ducts 58 to rotor housing connection is structurally sufficient to support the rotor housing 30 in a cantilever manner.

The rotor assembly includes a central shaft 60 supported within the rotor housing 30 by a flange bearing 62 at the upper or narrow end and by a collar bearing 64 and support member 66 connected diametrically across the opening at the wide or lower end. The central shaft 60 has a portion extending a distance beyond the collar bearing 64 where a fan blade assembly 52 is mounted thereon.

The rotor assembly 38, as seen in FIG. 7, includes at least 4 elongated lattices 68 emanating from collars 67 attached to the central shaft 60 and bound by bands 70 and 71 holding the parallel bands 76 in compression. Each lattice 68 includes a doubling bar 72 having an offset portion 74 located at the wide or base end of the conical shaped lattice.

Each lattice is composed of a series of horizontal bands 76 of approximately 3/32 inch thick arranged with intersecting planes, which may not necessarily be at repetitive angles, as seen in FIG. 8. The leading edges of each of the lattice bands 76 are sharpened, as seen in FIG. 8a. The rotor assembly is rotationally balanced between shaft centers by adding lead weights as necessary, the process commonly known within the art.

Figure 9:
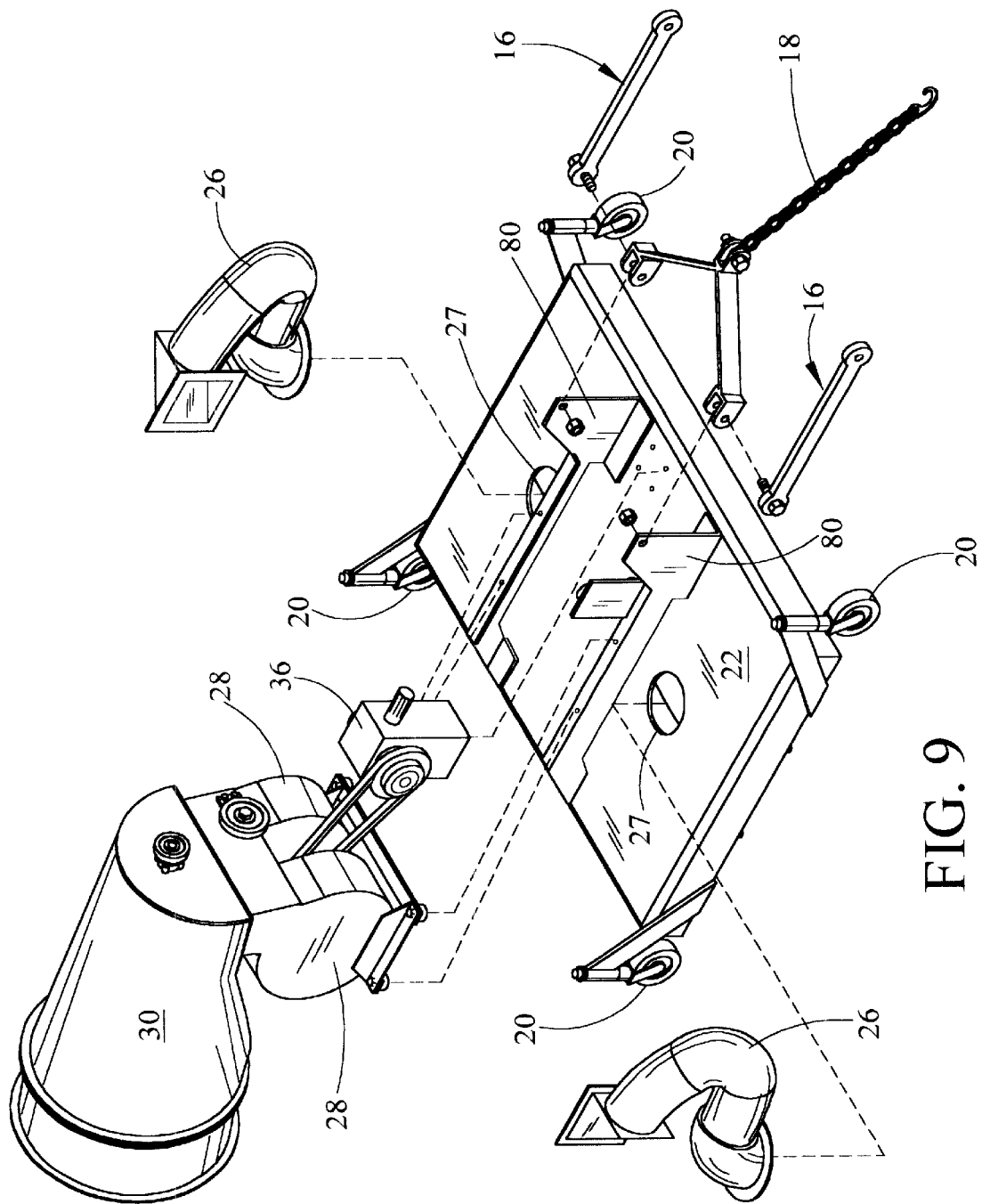
FIG. 9 is an exploded view of the preferred apparatus seen in FIG. 1.

A more detailed view of the major component parts is shown exploded in FIGS. 9, 10, and 11. In FIG. 9 we see the vacuum deck 22 fitted with the 4 swivel type wheels 20 located at each corner. Brackets 80 are provided for pivotal connection to the tractor 12 in three-point hitch arrangement whereby the tractor lifting arms 16 are capable of lifting the entire deck assembly 22 off the ground and whereby the clevis and chain assembly 18 provides for angular adjustment of the deck assembly, allowing the deck to pivot upwards at the trailing end but not allowing downward travel of the trailing end beyond a preset height established by the chain. Fan ducts 26 are mounted to the vacuum deck 22 over openings 27 therein and connect at their upper ends to the intakes of the high velocity fans 28. The gearbox is mounted to the vacuum deck in a manner whereby the drive shaft 34, seen in FIGS. 3 and 4, can easily make a sliding spline connection to the tractor's PTO output drive shaft.

As seen in FIG. 10, we see an end view of the rotor housing 30 in which a screen element 80 is inserted in the flange 56. This provides a retaining baffle for the finely mulched leaves to collect behind prior to discharge to insure particle sizing as low as possible usually between 50 microns and 1 inch long.

In addition to the general rotor assembly 38, as seen in FIG. 11, a directional nozzle housing 82 may be added for directing the fine particles downward or to either side of the tractor path if desired by simply orienting the nozzle 82.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A commercial leaf mulching apparatus comprising a means for adaptation to an agricultural tractor vehicle in a three point hitch arrangement whereby said tractor is capable of lifting said mulching apparatus clear of the ground, said apparatus having a means for vacuuming leaves and other fine debris in a wide swath from behind said tractor vehicle and blowing said leaves and other debris into one end of an elongated mulching shredder comprising a conical housing having a discharge end projecting rearwardly relative to said mulching apparatus and having a high speed, elongated conical rotor, rotatable therein, said rotor comprising a plurality of blades forming a plurality of lattices for mulching said leaves said means for vacuuming and said conical mulching shredder being driven by a drive shaft connected to a power output shaft located onboard said tractor vehicle, said conical rotor further comprising a a means for directional dispersion of mulched leaves and debris being discharged from said rotor housing over a large area adjacent said mulching apparatus.

2. A commercial leaf vacuum and mulching apparatus adaptive to a farm tractor vehicle having a typical three-point-hitch connection capable of lifting the apparatus clear of the ground and a power takeoff shaft, the apparatus comprising:

a) a rectangular structural deck supported at each corner by a swivel wheel;

b) a polymeric skirting located below said deck extending downward to near proximity with said ground;

c) at least one opening in said deck over which is connected a tubular duct;

d) at least one high velocity fan having an intake and exhaust port said intake port being connected to said tubular duct;

e) a conical rotor housing having a base and a directionally adjustable discharge end said base connected to said exhaust port of said high velocity fan;

f) a conical rotor assembly rotatable within said rotor housing having a plurality of blades forming a plurality of lattices;

g) a means for driving said fan and said rotor assembly connected to a power takeoff output shaft of said tractor; and h) a bracketing means for adapting said apparatus to the three-point hitch connection elements of a tractor.

3. The commercial leaf vacuum and mulching apparatus according to claim 2 wherein said mulching apparatus comprises two high velocity fans mounted in tandem and driven by a single belt.

4. The commercial leaf vacuum and mulching apparatus according to claim 2 wherein said means for driving said fan and said rotor is a speed increasing gear box driven by said power takeoff output shaft of said tractor.

5. The commercial leaf vacuum and mulching apparatus according to claim 2 wherein said conical rotor housing has a flattened portion adjacent its narrow end.

6. The commercial leaf vacuum and mulching apparatus according to claim 2 wherein said conical rotor housing is attached in a cantilever manner to said outlet of said high velocity fan.

7. The commercial leaf vacuum and mulching apparatus according to claim 2 wherein said conical rotor assembly comprises:

a) a central elongated shaft;

b) a plurality of hubs located axially along said shaft to which said plurality of lattices are attached parallel to said shaft and which extend radially outwardly therefrom in a conical shape, each lattice comprising a series of horizontal flat bands bent at odd angles in intersecting planes and connected one to the other by rivets, said lattices held in compression by a plurality of bands located perpendicular to said lattices internally and externally encircling the structure;

c) a flange bearing located adjacent one end of said shaft for connection to said rotor housing and rotatably supporting said rotor assembly;

d) a support member and a collar bearing located upon said shaft adjacent said lattices for diametrical attachment to said rotor housing and rotatable support of said rotor assembly; and e) a fan blade assembly located upon said shaft adjacent said support member and collar bearing.

8. The commercial leaf vacuum and mulching apparatus according to claim 7 wherein each said lattice is fitted with a doubling bar having an offset portion near one end attached to the base of said conical rotor.

9. The commercial leaf vacuum and mulching apparatus according to claim 8 wherein each of said horizontal flat bands and said doubling bar are sharpened along at least one edge.

10. The commercial leaf vacuum and mulching apparatus according to claim 9 wherein said conical rotor housing further comprises a fan shroud connected to said rotor housing by a flange connection.

11. The commercial leaf vacuum and mulching apparatus according to claim 10 wherein said shroud is a directional nozzle for directing mulch being dispersed from the rotor housing.

12. The commercial leaf vacuum and mulching apparatus according to claim 10 wherein said rotor housing further comprises a screen baffle attached between said rotor housing and said shroud at said flange connection.

13. The commercial leaf vacuum and mulching apparatus according to claim 2 wherein said conical rotor rotates at speeds in excess of 2000 RPM.

14. The commercial leaf vacuum and mulching apparatus according to claim 2 wherein said high velocity fan rotates in excess of 5000 RPM.

15. A method of vacuuming, mulching, and dispersing leaves and small debris over a large area comprising the steps of:

a) providing a vacuuming, mulching, and dispersing apparatus adaptive to a farm tractor vehicle having a typical three-point-hitch connection capable of lifting said apparatus clear of the ground and a power takeoff shaft, the apparatus comprising;

i) a rectangular structural deck supported at each corner by a swivel wheel;

ii) a polymeric skirting located below said deck extending downward to near proximity with the earth;

iii) at least one opening in said deck over which is connected a tubular duct;

iv) at least one high velocity fan having its intake connected to said tubular duct;

v) a conical rotor housing connected to the outlet of said high velocity fan;

vi) a conical rotor assembly rotatably located within said rotor housing;

vii) a drive shaft for driving said fan and said rotor assembly connected to the power takeoff output shaft of said tractor; and viii) a bracketing means for adapting said apparatus to the three-point hitch connection elements of a tractor;

b) making said three-pint hitch connection to said tractor;

c) connecting said drive shaft to said tractor power takeoff shaft;

d) driving said tractor at a relatively high speed over fallen leaves and debris with said power takeoff engaged said high velocity fan creating a vacuum beneath said deck, thereby collecting leaves and debris from beneath said deck and blowing them into said conical rotor housing;

e) mulching and particle sizing said debris within said conical rotor housing by repetitious contact with said conical rotor rotating at a speed in excess of 2000 rpm, the rotor comprising:

i) a central elongated shaft;

ii) a plurality of hubs located axially along said shaft having a plurality of lattices attached parallel to said shaft and extending radially outwardly therefrom in a conical shape, each lattice comprising a series of horizontal flat bands bent at odd angles in intersecting planes and connected one to the other by rivets, said lattices held in compression by a plurality of bands located perpendicular to said lattices internally and externally encircling the structure;

iii) a flange bearing located adjacent one end of said shaft for connection to said rotor housing and rotatably supporting said rotor assembly;
iv) a support member and a collar bearing located upon said shaft adjacent said lattices for diametrical attachment to said rotor housing and rotatable support of said rotor assembly; and
v) a fan blade assembly located upon said shaft adjacent said support member and collar bearing;
f) dispersing said debris from said rotor housing at high velocity over a large area.

16. The method of vacuuming, mulching, and dispersing leaves and small debris according to claim 15, further including the step of lifting said vacuuming, mulching, and dispersing apparatus when turning said tractor around in a tight circle.

17. The method of vacuuming, mulching, and dispersing leaves and small debris according to claim 15, further including the step of reducing the particle size of said debris to between fifty micron and 1 inch in length.

* * * * *